(12) United States Patent
Ogino et al.

(10) Patent No.: US 9,302,569 B2
(45) Date of Patent: Apr. 5, 2016

(54) WATERPROOF STRUCTURES OF VEHICLE DOORS

(71) Applicant: DAIWA KASEI KOGYO KABUSHIKI KAISHA, Aichi (JP)

(72) Inventors: Tetsuya Ogino, Aichi (JP); Jyunya Ukai, Aichi (JP); Toshio Iwahara, Aichi (JP); Makoto Kato, Aichi (JP)

(73) Assignee: Daiwa Kasei Kogyo Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 14/416,583

(22) PCT Filed: Jun. 25, 2013

(86) PCT No.: PCT/JP2013/067328
§ 371 (c)(1),
(2) Date: Jan. 22, 2015

(87) PCT Pub. No.: WO2014/024591
PCT Pub. Date: Feb. 13, 2014

(65) Prior Publication Data
US 2015/0202949 A1 Jul. 23, 2015

(30) Foreign Application Priority Data

Aug. 10, 2012 (JP) .................. 2012-177971

(51) Int. Cl.
*B60J 5/00* (2006.01)
*B60J 5/04* (2006.01)
(Continued)

(52) U.S. Cl.
CPC *B60J 5/0418* (2013.01); *B60J 5/00* (2013.01); *B60R 13/0206* (2013.01); *B60R 13/0243* (2013.01); *B60R 13/0275* (2013.01); *B60R 13/07* (2013.01)

(58) Field of Classification Search
CPC ........... B60J 5/0418; B60J 5/00; B60R 13/07; B60R 13/0243; B60R 13/0275; B60R 13/0206; F16B 5/0621; F16B 5/0664; F16B 21/09; F16B 21/07; F16B 2/082
USPC .......... 49/463, 465, 466; 296/146.7; 411/104, 411/508
See application file for complete search history.

(56) References Cited

U.S. PATENT DOCUMENTS 2,073,897 A * 3/1937 Loetscher .................. 292/194
4,424,612 A * 1/1984 Muller et al. .................. 24/669

(Continued)

FOREIGN PATENT DOCUMENTS

DE 102010025941 A1 * 1/2012
JP 5-50120 U 7/1993

(Continued)

*Primary Examiner* — Jerry Redman (57) ABSTRACT

A waterproofing structure for a vehicle door having a cover member for closing a service hole formed in an inner panel, and a clip for detachably mounting the cover member to the inner panel. The cover member includes a seat portion and a tool hole. The seat portion is formed on an outer side of the cover member facing the inner panel, and the clip is mounted thereto. To detach the clip from the inner panel, a tool is inserted into the tool hole from an inner side. The clip includes a countersunk head covering the tool hole to seal the hole while the clip is mounted to the seat portion. The seat portion serves as a canopy with respect to the tool hole, and changes a course of water entering an interior of the door and falling toward the tool hole from the outer side of the cover member.

2 Claims, 13 Drawing Sheets

(51) Int. Cl.
  *B60R 13/02*     (2006.01)
  *B60R 13/07*     (2006.01)

(56) References Cited

U.S. PATENT DOCUMENTS

| | | | |
|---|---|---|---|
| 4,987,656 A * | 1/1991 | Sato | 24/297 |
| 5,651,634 A * | 7/1997 | Kraus | 403/408.1 |
| 5,704,753 A * | 1/1998 | Ueno | 411/509 |
| 6,196,607 B1 * | 3/2001 | Gulisano | 296/39.1 |
| 7,114,221 B2 * | 10/2006 | Gibbons et al. | 24/289 |
| 7,178,855 B2 * | 2/2007 | Catron et al. | 296/146.7 |
| 7,186,051 B2 * | 3/2007 | Benedetti et al. | 403/388 |
| 7,481,474 B2 * | 1/2009 | Higgins et al. | 296/1.08 |
| 7,959,214 B2 * | 6/2011 | Salhoff | 296/146.7 |
| 8,381,368 B2 * | 2/2013 | Donahue-Yan et al. | 24/297 |
| 8,393,058 B2 * | 3/2013 | Okada et al. | 24/297 |
| 8,511,631 B2 * | 8/2013 | Kato et al. | 248/316.7 |
| 8,714,630 B2 * | 5/2014 | Schmied et al. | 296/191 |
| 8,834,087 B2 * | 9/2014 | Kirchen | 411/508 |
| 8,898,866 B2 * | 12/2014 | Asai | 24/292 |
| 2006/0017306 A1 * | 1/2006 | Smith et al. | 296/146.7 |
| 2006/0214468 A1 * | 9/2006 | Cass et al. | 296/146.16 |
| 2007/0107174 A1 * | 5/2007 | Bordas | 24/664 |
| 2007/0204530 A1 * | 9/2007 | Janesky | 52/169.14 |
| 2011/0035909 A1 * | 2/2011 | Moberg | 24/289 |
| 2011/0119875 A1 * | 5/2011 | Iwasaki | 24/458 |
| 2012/0261942 A1 * | 10/2012 | Benedetti | 296/146.7 |
| 2012/0317757 A1 * | 12/2012 | Risdale et al. | 24/458 |
| 2013/0117969 A1 * | 5/2013 | Mazur | 24/292 |
| 2013/0255065 A1 * | 10/2013 | Bachelder et al. | 29/525.01 |
| 2014/0190087 A1 * | 7/2014 | Chwala | 49/460 |
| 2014/0191526 A1 * | 7/2014 | Lauxen et al. | 296/1.08 |
| 2014/0284962 A1 * | 9/2014 | Mally | 296/146.7 |

FOREIGN PATENT DOCUMENTS

| | | |
|---|---|---|
| JP | 2002-321570 A | 11/2002 |
| JP | 2004-176897 A | 6/2004 |
| JP | 2004-203339 A | 7/2004 |
| JP | 2004-359131 A | 12/2004 |
| JP | 2006-076343 A | 3/2006 |
| JP | 2007-290589 A | 11/2007 |

* cited by examiner

WATERPROOF STRUCTURES OF VEHICLE DOORS

PRIORITY CLAIM

The present application is a National Phase entry of PCT Application No. PCT/JP2013/067328, filed Jun. 25, 2013, which claims priority from Japanese Patent Application No. 2012-177971, filed Aug. 10, 2012, the disclosures of which are hereby incorporated by reference herein in their entirety.

BACKGROUND OF THE INVENTION

Embodiments of the present invention relate to a waterproofing structure for a vehicle door. Specifically, they relate to a waterproofing structure for a vehicle door which has a cover member closing a service hole formed in an inner panel, and a clip for detachably mounting the cover member to the inner panel.

A vehicle door has an inner panel and an outer panel. Various apparatuses or mechanisms are incorporated into the space between the inner panel and the outer panel together with wiring, etc. The apparatuses, etc. are incorporated by utilizing a service hole formed in the inner panel. After the completion of the incorporating operation, the service hole is closed by a cover member.

Japanese Laid-Open Patent Publication No. 2004-359131 discloses an example of a waterproofing structure for a vehicle door. In this technique, a resin plate for closing the service hole is formed on the inner panel through insert molding. The resin plate exhibits a waterproofing property to prevent rainwater or the like that enters the door interior between the inner panel and the outer panel from entering the vehicle interior through the service hole. Further, the resin plate has a sound insulation property preventing the transmission of sound through the service hole, a dustproofing property preventing the intrusion of dust through the service hole, etc.

In order that the door interior may be repaired, it is desirable for the cover member for closing the service hole of the inner panel to be detachable with respect to the inner panel. However, the resin plate of Japanese Laid-Open Patent Publication No. 2004-359131 is not detachable with respect to the inner panel. When the cover member is made detachable with respect to the inner panel, the cover member must be provided with a gasket in order to secure the waterproofing property, sound insulation property, and dustproofing property of the service hole. This involves an increase in costs.

In a configuration in which the cover member is detachably mounted to the inner panel by using a clip, a tool hole is usually formed in the cover member. A tool used when detaching the clip from the inner panel is inserted into the tool hole towards the clip. Thus, as with the service hole of the inner panel, the tool hole has to be given a waterproofing property, sound insulation property, dustproofing property, etc.

There is a need for a waterproof structure which has a cover member detachable with respect to the inner panel by a clip and in which a waterproofing property, sound insulation property, and dustproofing property are secured for a tool hole formed in the cover member without a sealing gasket.

SUMMARY OF THE INVENTION

According to one aspect of the present invention, a waterproofing structure for a vehicle door may have a cover member closing a service hole formed in an inner panel, and a clip for detachably mounting the cover member to the inner panel. The cover member may be provided with a seat portion and a tool hole. The seat portion is formed on an outer side of the cover member facing the inner panel, and the clip is mounted thereto. To detach the clip from the inner panel, a tool is inserted into the tool hole from an inner side which is opposite the outer side. The clip is provided with a countersunk head configured to cover the tool hole to seal the tool hole while the clip is mounted to the seat portion of the cover member. The seat portion of the cover member is situated so as to serve as a canopy with respect the tool hole, and is configured to change the course of water entering an interior of the door and falling toward the tool hole from the outer side of the cover member.

Thus, when water enters the interior of the door and falls toward the tool hole of the cover member, the falling direction of the water is changed by the seat portion. And the water is discharged to the exterior from a lower portion of the door. The clip has a countersunk head, which helps to secure the sound insulation property and dustproofing property of the tool hole while enhancing the waterproofing property of the tool hole. Thus, although the cover member is detachably mounted to the inner panel by the clip, it is possible to secure the waterproofing property with respect to the tool hole without having to use a waterproof gasket, and to maintain the sound insulation property and dustproofing property.

According to another aspect of the present invention, a waterproofing structure for a vehicle door may have a cover member for closing a service hole formed in an inner panel, and a clip for detachably mounting the cover member to the inner panel. The cover member may be provided with a mounting hole, a water receiver and a drain hole. The mounting hole extends between an outer side facing the inner panel and an inner side opposite the outer side. The water receiver surrounds the mounting hole on the inner side of the cover member. The drain hole establishes communication between an interior of the water receiver and an exterior of the cover member. The clip may be provided with a seal portion sealing the mounting hole while the clip is mounted to the cover member. The water receiver of the cover member is configured to receive water entering to the inner side of the cover member through the mounting hole. And the drain hole is configured to discharge the water to the outer side of the cover member.

Thus, most of the water having entered the door interior is prevented from passing through the mounting hole due to the seal portion of the clip. Even if some water is allowed to pass the mounting hole, the water is received by the water receiver of the cover member, and flows to the outer side of the cover member through the drain hole. The seal portion of the clip secures the sound insulation property and dustproofing property of the mounting hole. Thus, although the cover member is detachably mounted to the inner panel by the clip, it is possible to secure the waterproofing property of the tool hole without having to use a waterproof gasket, and to maintain the sound insulation property and dustproofing property.

DETAILED DESCRIPTION OF THE INVENTION

Figure 1:
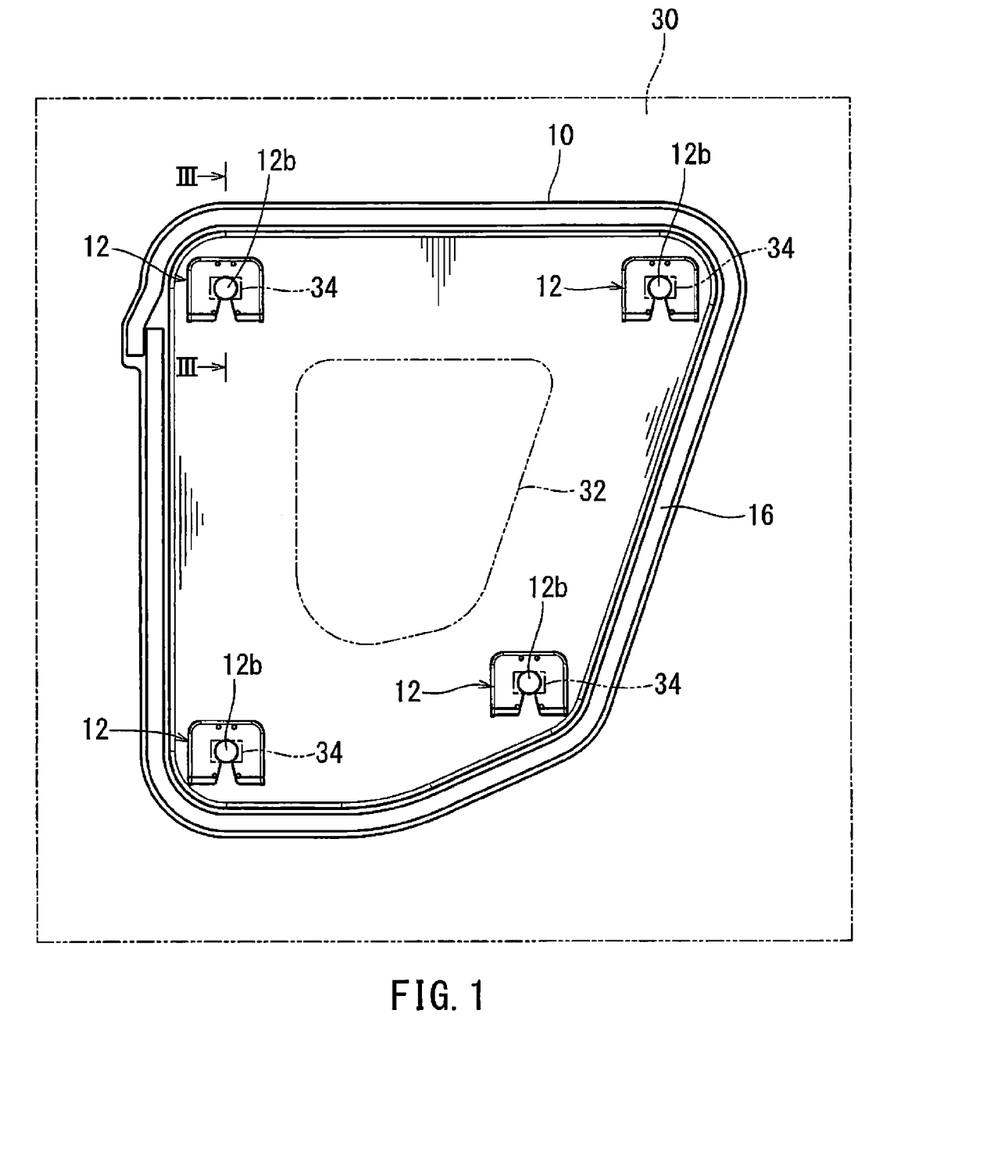
FIG. 1 is a rear view of a cover member.

A first embodiment of the present invention will be described with reference to FIGS. 1 to 11. As shown in FIGS. 1 and 9, an inner panel 30 of a vehicle door forms a space between itself and an outer panel (not shown). Various apparatuses or mechanisms are incorporated into the space. The inner panel 30 is provided with a plurality of or a single service hole 32 for performing maintenance operation on the apparatuses or the mechanisms. To maintain the waterproofing property, sound insulation property, and dustproofing property, the service hole 32 is closed by a cover member 10.

As shown in FIG. 1, the inner panel 30 has four clip holes 34 around the service hole 32. Each clip hole 34 is of a rectangular configuration. As shown in FIG. 9, an anchor portion 24 of a clip 20 is connected thereto. The inner panel 30, indicated by a phantom line in FIG. 1, is situated on the front side of the cover member 10 in terms of the plane of the drawing. The external configuration of the inner panel 30 is only shown for the sake of convenience. It is different from the actual configuration.

Figure 2:
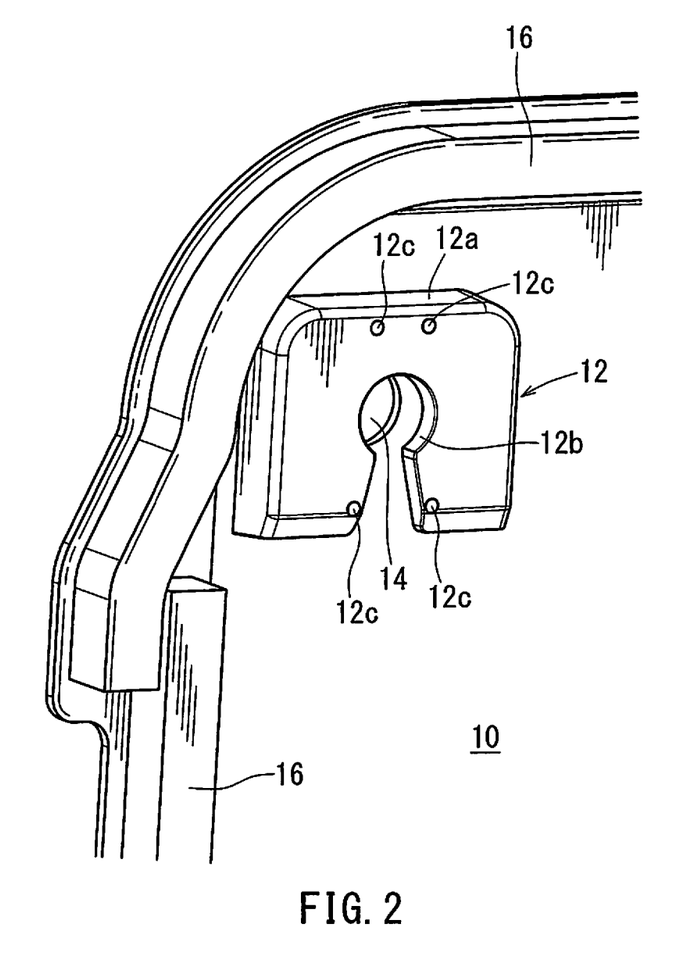
FIG. 2 is an enlarged perspective view of a part of FIG. 1.

As shown in FIGS. 1 and 9, the cover member 10 is a resin molding. The cover member 10 has an outer surface opposite the inner panel 30. Four seat portions 12 for mounting clips 20 are integrally molded with the outer surface. The seat portions 12 are at positions (four corners) respectively corresponding to clip holes 34 of the inner panel 30. Each seat portion 12 has a configuration open on the door lower side. On the front surface portion of each seat portion 12, there is provided a mounting hole 12b for mounting a base portion 22 of the clip 20. The mounting hole 12b is of a round configuration and is opened by a slit that is directed downward. As shown in FIG. 2, a plurality of (four) protrusions 12c are provided on the surface of the front surface portion of the seat portion 12. The protrusions 12c regulate the rotation around the axis of the clip 20 mounted to the seat portion 12.

Figure 3:
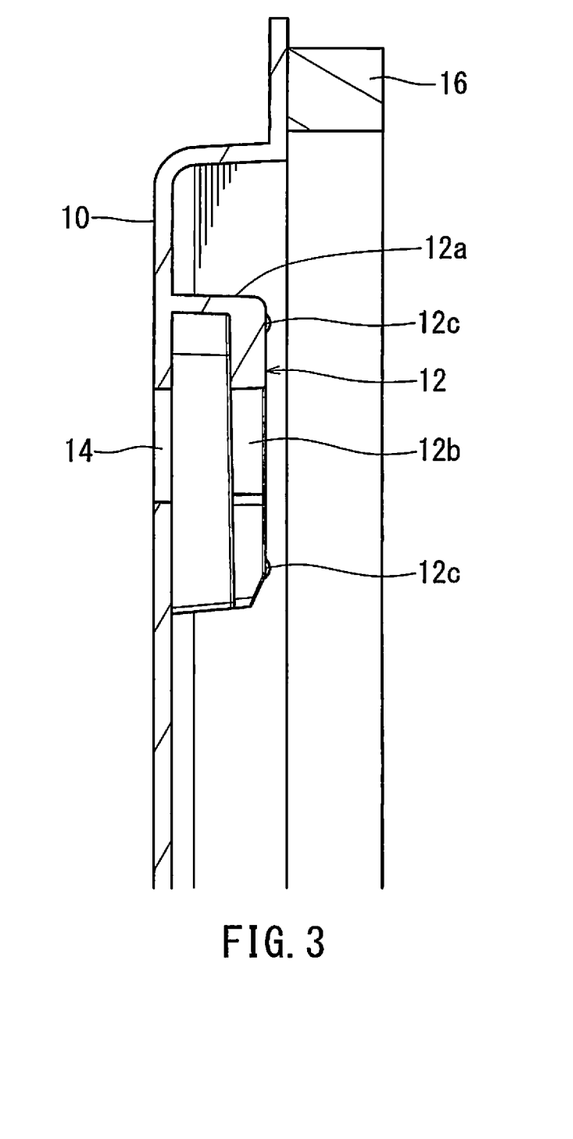
FIG. 3 is a cross-sectional view taken along line in FIG. 1.
Figure 4:
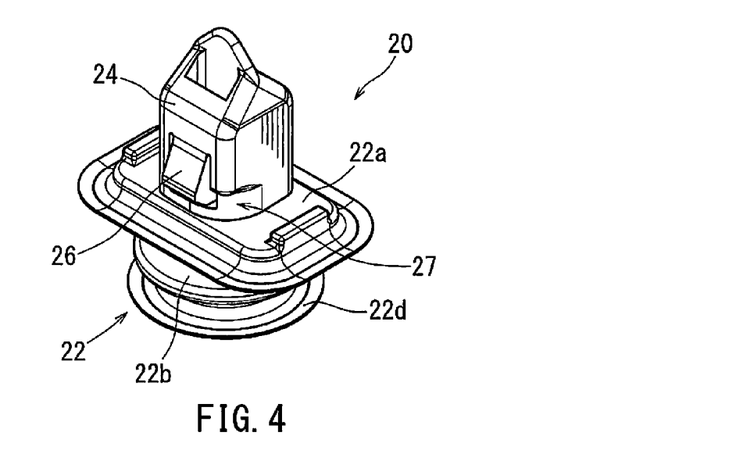
FIG. 4 is a perspective view of a clip.
Figure 5:
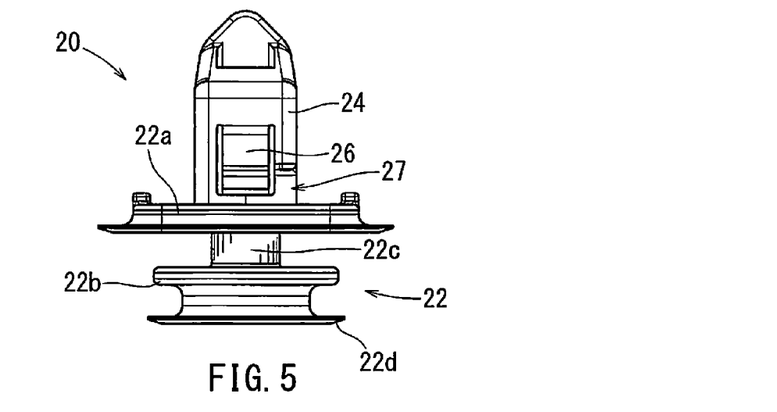
FIG. 5 is a front view of the clip.

As shown in FIGS. 2 and 3, the cover member 10 has tool holes 14 respectively extending through portions of corresponding seat portions 12. Each tool hole 14 is situated coaxially with the mounting hole 12b of the seat portion 12. Any tools can be inserted into the tool hole 14 from the other side of the seat portion 12. On an external edge of the outer surface of the cover member 10, there is provided an EPT SEALER 16 sealing the area between the cover member 10 and the inner panel 30.

As shown in FIGS. 4 to 8, the clip 20 is formed of resin. The clip 20 has a base portion 22 mounted to the seat portion 12 of the cover member 10, and an anchor portion 24 connected to the clip hole 34 of the inner panel 30. The base portion 22a has a first flange 22a, a second flange 22b and a neck portion 22c. The first flange 22a is of a rectangular plan configuration. The second flange 22b is of a circular plan configuration. The neck portion 22c is of a columnar configuration, and is situated between the first flange 22a and the second flange 22b. A countersunk head 22d is provided at the end of the second flange 22b.

Figure 6:
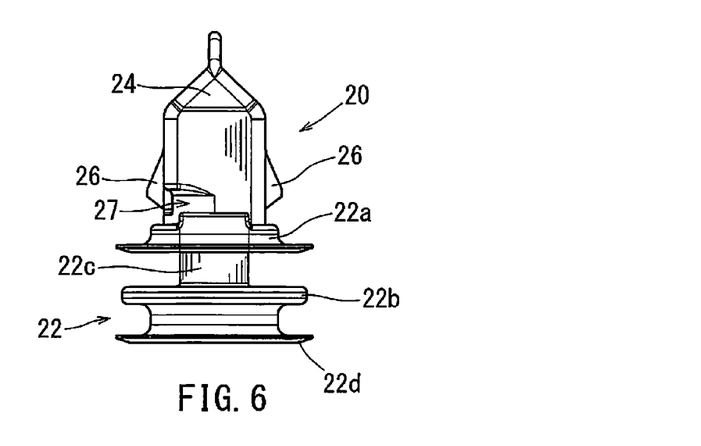
FIG. 6 is a side view of the clip.
Figure 8:
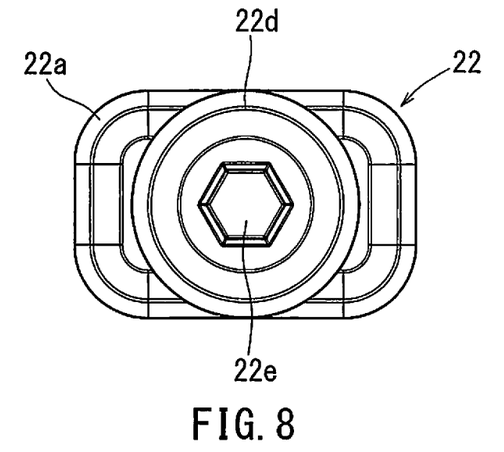
FIG. 8 is a bottom view of the clip.
Figure 9:
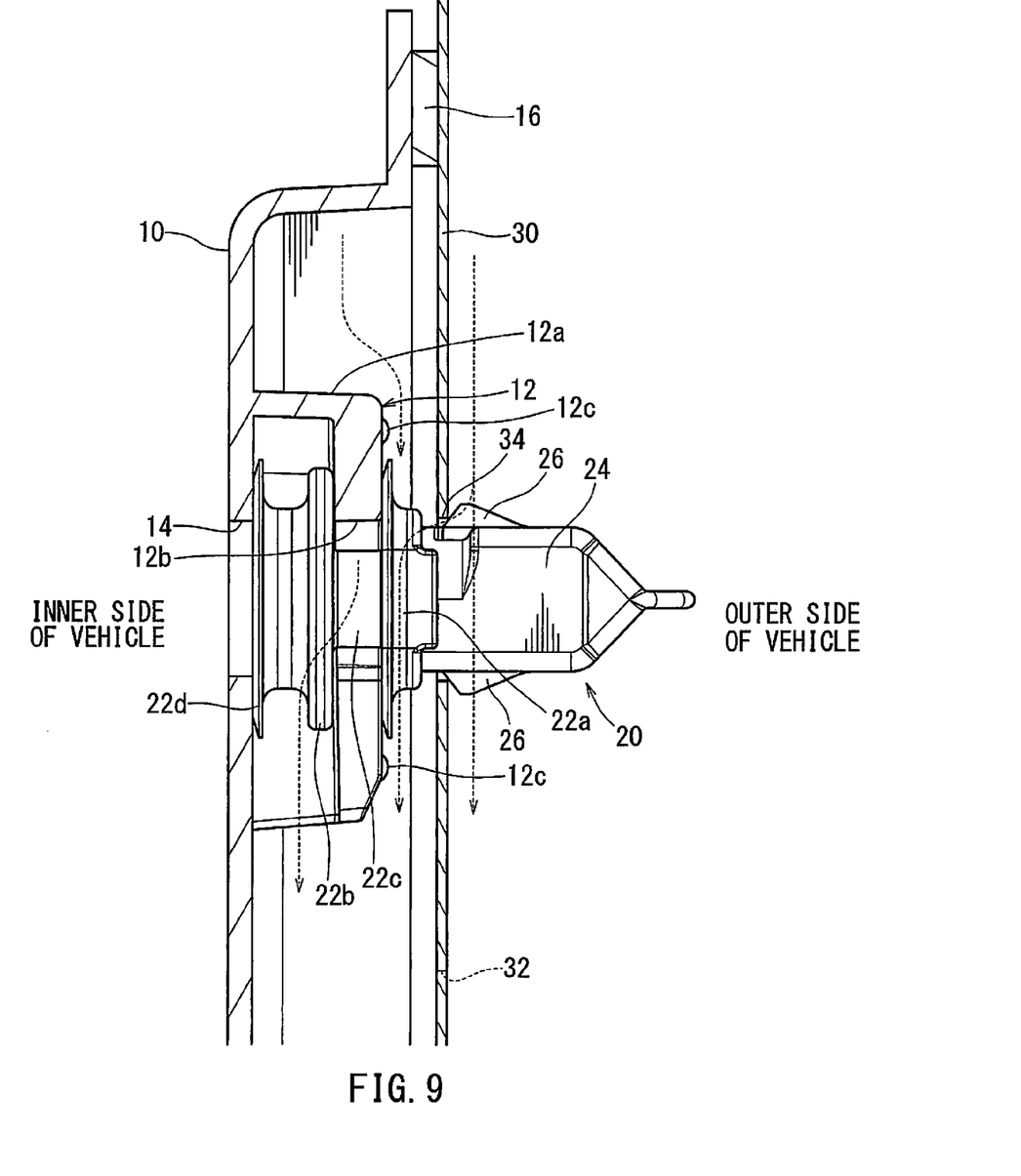
FIG. 9 is a cross-sectional view of the cover member and an inner panel.

As shown in FIGS. 6 and 8, at the center of the end surface of the base portion 22 having the countersunk head 22d, there is provided a tool insertion hole 22e into which a tool such as a hexagonal wrench is inserted. The distance between the first flange 22a and the second flange 22b is set to be a dimension slightly larger than the thickness of the front surface portion of the seat portion 12 shown in FIG. 3. The outer diameter of the neck portion 22c is set to be a dimension slightly smaller than the inner diameter of the mounting hole 12b of the seat portion 12 shown in FIG. 3.

Figure 7:
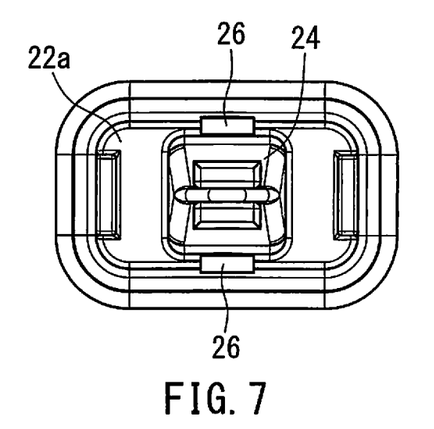
FIG. 7 is a plane view of the clip.
Figure 10:
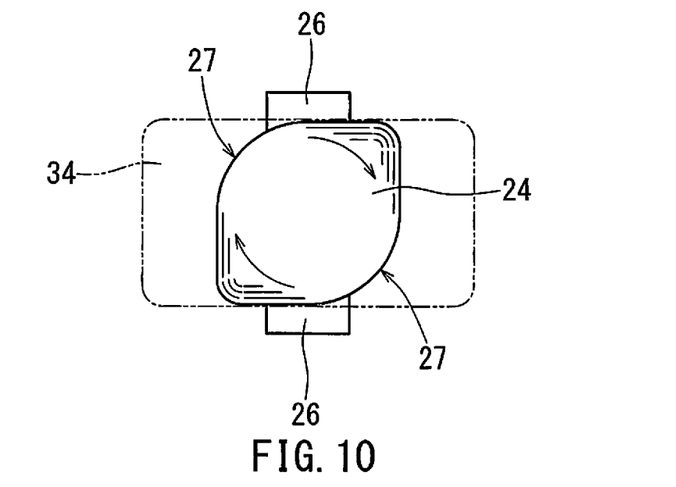
FIG. 10 is a schematic view of the clip and a clip hole.
Figure 11:
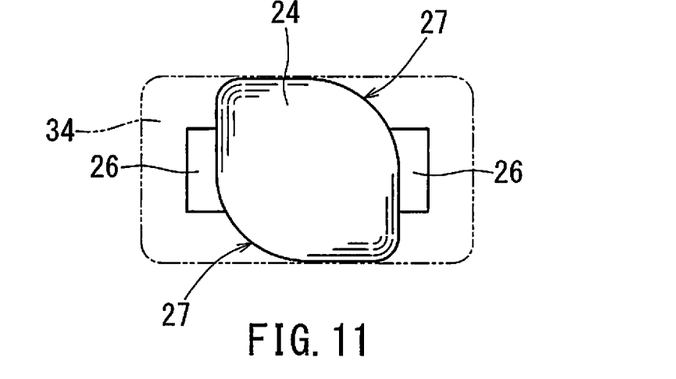
FIG. 11 is a schematic view of the clip and the clip hole.

As shown in FIGS. 7 and 9, the anchor portion 24 of the clip 20 is of a prism-like configuration that allows it to be inserted into the clip hole 34 of the inner panel 30. The anchor portion 24 is provided with a pair of elastic claws 26. As shown in FIGS. 10 and 11, the outer configuration of the anchor portion 24 is formed such that there are two arcuate portions 27 at diagonal positions on a plan section. The anchor portion 24 inserted into the clip hole 34 can be rotated by approximately 90 degrees to the left or right (e.g., clockwise) from the position shown in FIG. 10 to the position shown in FIG. 11.

As shown in FIG. 11, the two elastic claws 26 can freely pass the clip hole 34 when arranged in the elongated direction of the clip hole 34. As shown in FIG. 10, the two elastic claws 26 can only be inserted when arranged in the direction in which the shorter sides of the clip hole 34 extend. That is, when inserted into the clip hole 34, the two elastic claws 26 situated as shown in FIG. 10 are pushed and deflected before passing the clip hole 34. After passing the clip hole 34, the two elastic claws 26 are engaged with the hole edges of the longer sides of the clip hole 34. As a result, the anchor portion 24 is prevented from being pulled out of the clip hole 34.

The procedures for closing the service hole 32 of the inner panel 30 by the cover member 10 will be described. As shown in FIGS. 2 and 9, at first the clip 20 is mounted to each seat portion 12 of the cover member 10. More specifically, the neck portion 22c of the base portion 22 of each clip 20 is inserted from below into the mounting hole 12b of each seat portion 12 through the slit. As a result, the first flange portion 22a is situated on the front side of the front surface of the seat portion 12. The second flange 22b is situated on the inner side of the seat portion 12.

As shown in FIGS. 2 and 9, the first flange 22a is situated between two protrusions 12c on the upper portion of the seat portion 12 and two protrusions 12c on the lower portion of seat portion 12. The protrusions 12c regulate the rotation of the clip 20 around its axis with respect to the seat portion 1. As a result, the clip 20 is retained at the position as shown in FIGS. 9 and 10, i.e., at the position where the two elastic claws 26 are arranged in the direction in which the shorter sides of the clip hole 34 extend. When the clip 20 is mounted to the seat portion 12, the countersunk head 22d of the base portion 22 covers the tool hole 14 of the cover member 10. As a result, it is possible to secure the waterproofing property, sound insulation property, and dustproofing property with respect to the tool hole 14.

Next, the anchor portion 24 of each clip 20 is inserted into each clip hole 34 of the inner panel 30. After the two elastic claws 26 of the anchor portion 24 have passed the clip hole 34, the two elastic claws 26 are engaged with the hole edges of the longer sides of the clip hole 34. As a result, the cover member 10 is mounted to the inner panel 30 so as to close the service hole 32. The EPT SEALER 16 of the cover member 10 is pressed against the surface of the inner panel 30. The EPT SEALER 16 seals the area between the cover member 10 and the inner panel 30.

When performing a maintenance operation or the like on the apparatuses incorporated into the interior of the door, it is necessary to detach the cover member 10 from the service panel 30, and to open the service hole 32. In this case, a door trim board (not shown) is detached; and then a tool such as a hexagonal wrench is inserted into the tool hole 14 of the cover member 10. The tool is fit-engaged with a tool insertion portion 22e of the clip 20, and the clip 20 is rotated around its axis by the tool. As a result, the first flange portion 22a of the base portion 22 gets over the protrusions 12c of the seat portion 12. The anchor portion 24 can rotate to the left or right by approximately 90 degrees from the position of FIG. 10. As shown in FIG. 11, the two elastic claws 26 of the anchor portion 24 are arranged in the elongated direction of the clip hole 34 of the inner panel 30. The anchor portion 24 is pulled out of the clip hole 34, and the cover member 10 is removed from the inner panel 30.

In the state in which the service hole 32 is closed by the cover member 10 as shown in FIG. 9, it may happen that rainwater or the like having entered the door interior passes the EPT SEALER 16, and falls toward the tool hole 14 of the cover member 10. As indicated by the dotted arrow line of FIG. 9, the falling direction can be changed along the outer surface 12a of the seat portion 12. As a result, the falling water is discharged to the exterior from the lower portion of the door without heading for the tool hole 14. The tool hole 14 is sealed by the countersunk head 22d of the clip 20. Thus, it is possible to maintain the waterproofing property, sound insulation property, and dustproofing property for the tool hole 14. Thus, it is possible to prevent the intrusion of water, noise, or dust into the vehicle interior.

Figure 12:
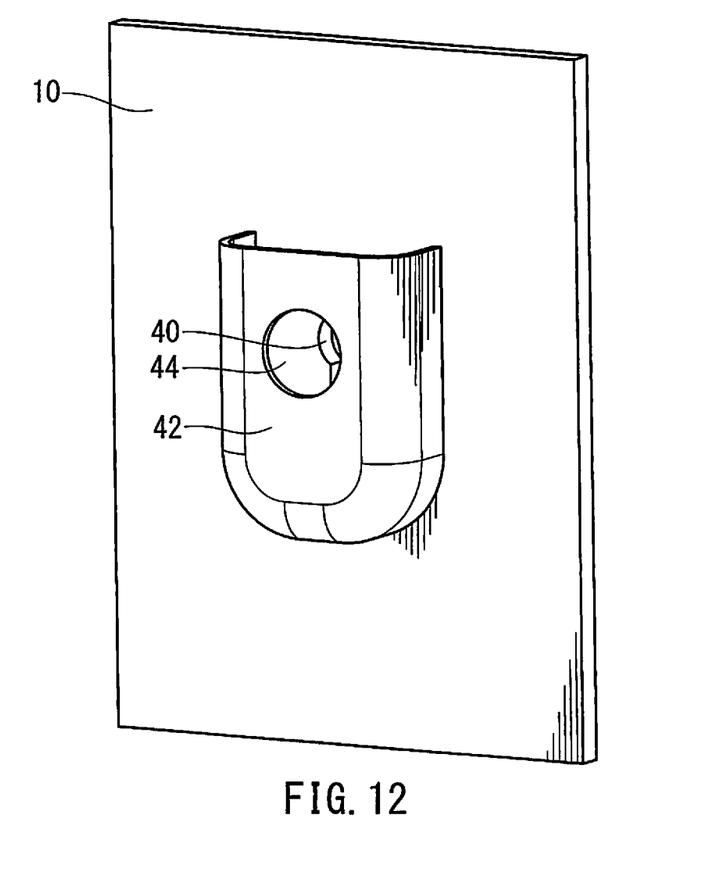
FIG. 12 is a rear perspective view of a part of a cover member according to a second embodiment.
Figure 13:
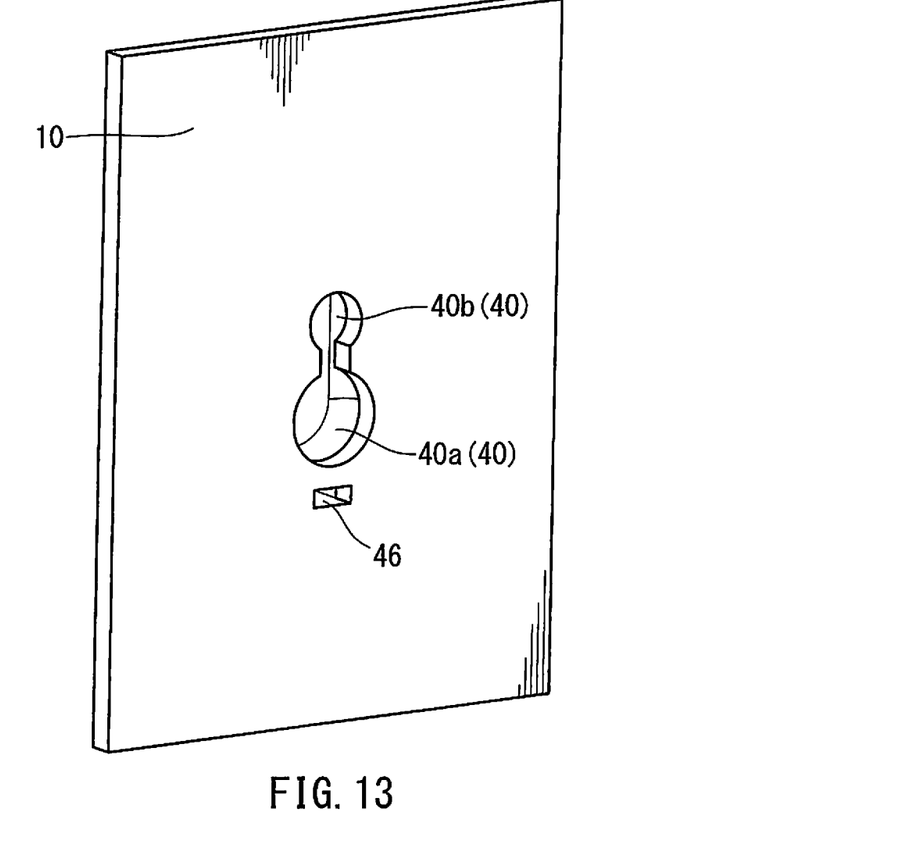
FIG. 13 is a front perspective view of the part of the cover member of FIG. 12.
Figure 14:
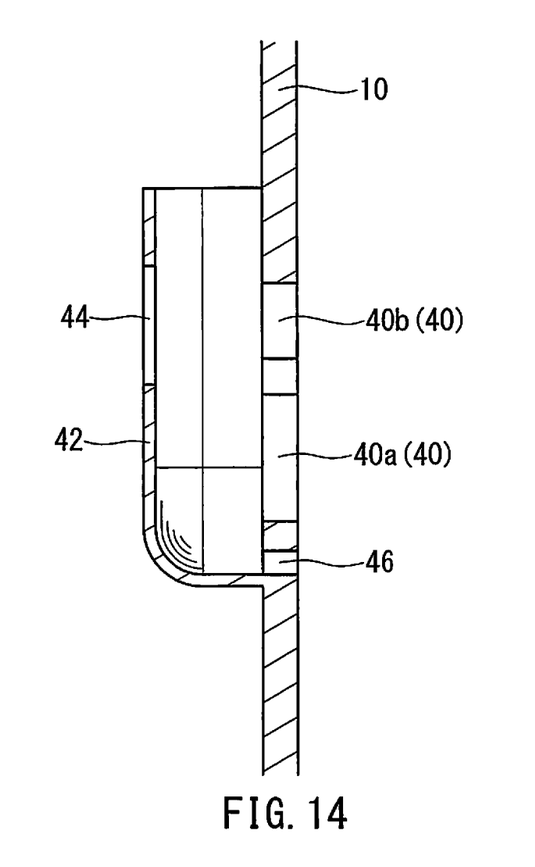
FIG. 14 is a cross-sectional view of the part of the cover member of FIG. 13.

A second embodiment of the present invention will be described with reference to FIGS. 12 to 20. As in the first embodiment, the cover member 10 closes the service hole 32 formed in the inner panel 30 of the door. The cover member 10 as shown in FIGS. 12 and 13 is simplified in an outer configuration, and the outer configuration shown differs from the actual configuration. As shown in FIG. 20, the cover member 10 is detachably mounted to the inner panel 30 of the door by clips 50 mounted to a plurality of positions. The cover member 10 has an outer surface opposite the inner panel 30. The EPT SEALER 16 is provided in the periphery of the outer peripheral surface.

As shown in FIGS. 12, 13, and 20, the cover member 10 is provided with a mounting hole 40 for mounting a base portion 52 of each clip 50. The mounting hole 40 extends between the outer surface facing the inner panel 30 and the inner side surface opposite the same. The mounting hole 40 has a large-diameter hole 40a and a small-diameter hole 40b communicating with each other via a narrow slit.

As shown in FIGS. 12 and 20, a water receiver 42 surrounding the mounting hole 40 is integrally formed on the inner side of the cover member 10. The water receiver 42 exhibits a box-like configuration that opens on the upper side. The water receiver 42 has a tool hole 44 coaxial with the small-diameter hole 40b of the mounting hole 40. Thus, any tool can be inserted into the mounting hole 40 through the tool hole 44 from the inner side of the cover member 10.

As shown in FIGS. 15 to 20, like the clip 20, the clip 50 is formed of resin. The clip 50 is provided with a base portion 52 mounted to the mounting hole 40 of the cover member 10, and an anchor portion 56 to be connected to the clip hole 34 of the inner panel 30. The base portion 52 has a seal portion 52a, a flange portion 52b, and a neck portion 52c. The seal portion 52a is of a rectangular plan configuration. The flange portion 52b is of a circular plan configuration. The neck portion 52c is of a columnar configuration and is situated between the seal portion 52a and the flange portion 52b.

Figure 15:
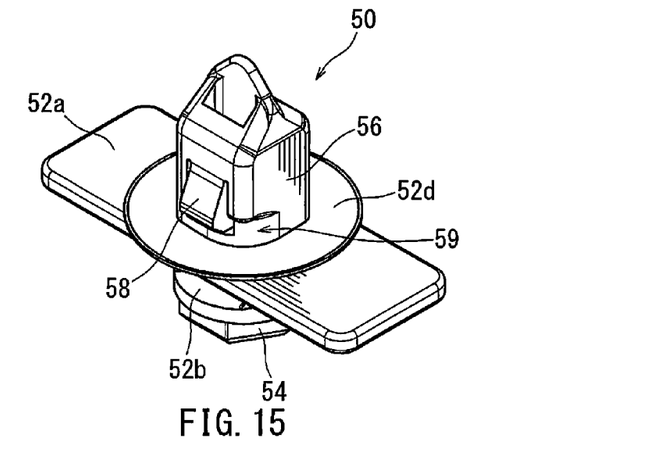
FIG. 15 is a perspective view of a clip according to the second embodiment.
Figure 19:
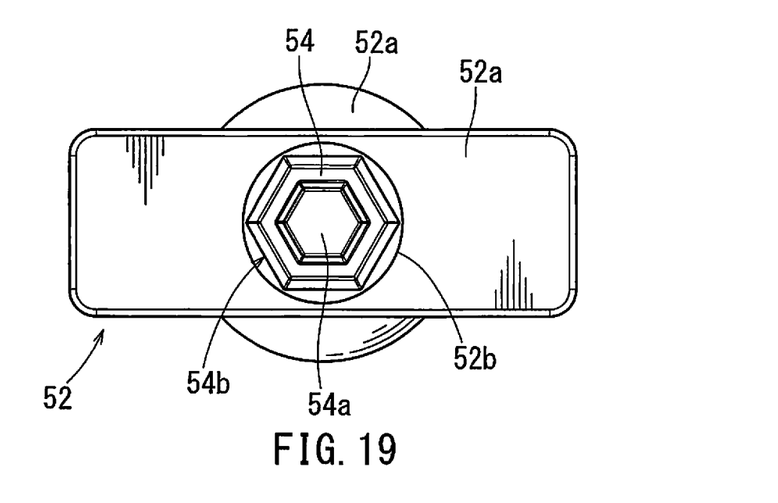
FIG. 19 is a bottom view of the clip of FIG. 15.
Figure 20:
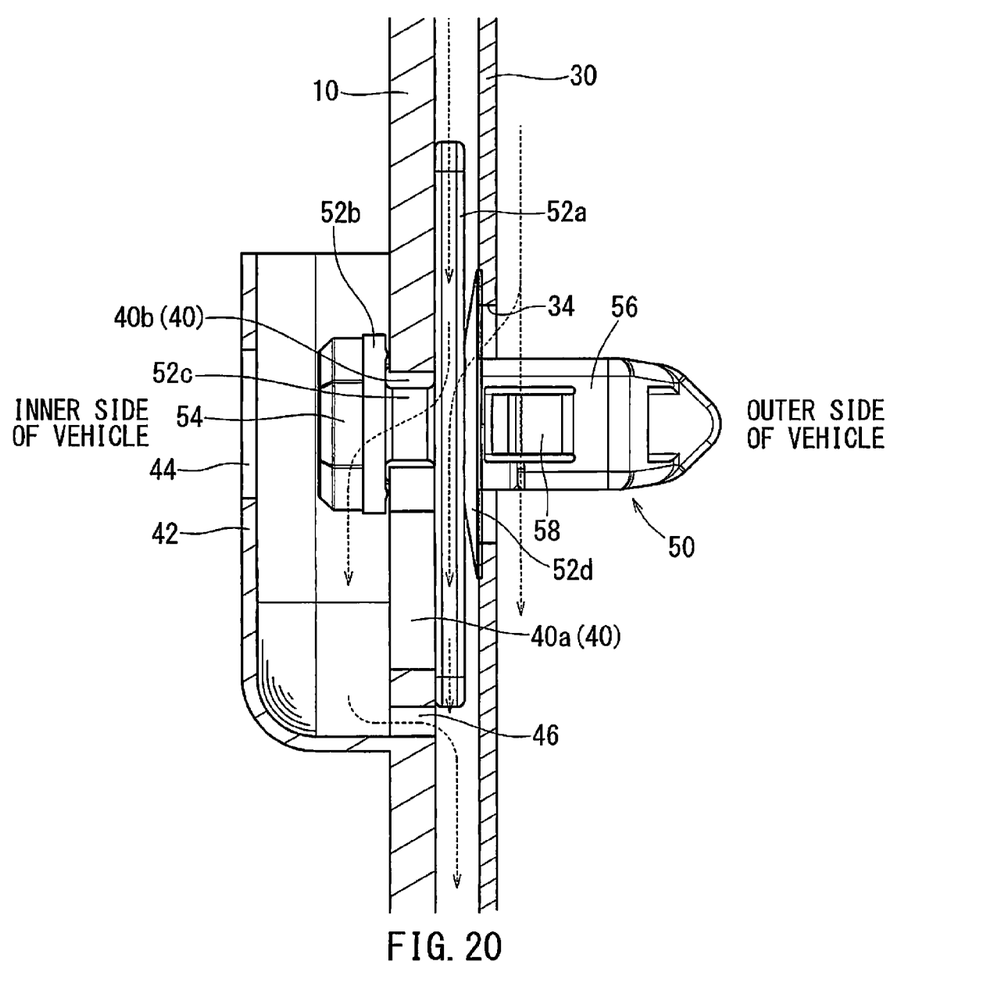
FIG. 20 is a cross-sectional view of the inner panel and the cover member according to the second embodiment.

As shown in FIGS. 15 and 19, a countersunk head 52d is formed at the proximal end of the anchor portion 56. A tool block 54 is provided at the end of the flange 52b. The tool block 54 has an insertion portion 54a and a hexagonal portion 54b. The insertion portion 54a is situated at the center of the end surface of the tool block 54, and is fit-engaged with a tool such as a hexagonal wrench. The hexagonal portion 54b is provided on the outer peripheral surface of the tool block 54, and is of a configuration corresponding to a tool such as a spanner.

Figure 16:
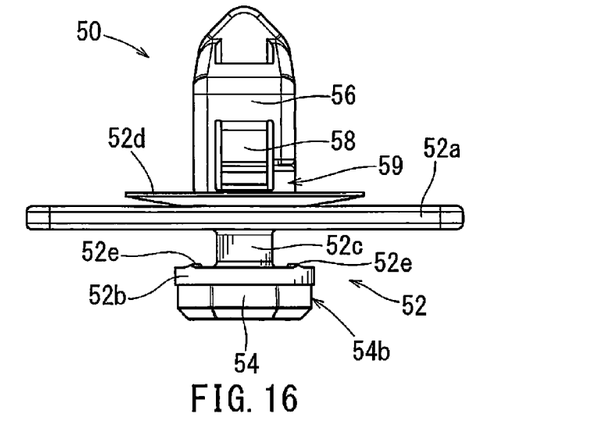
FIG. 16 is a front view of the clip of FIG. 15.
Figure 17:
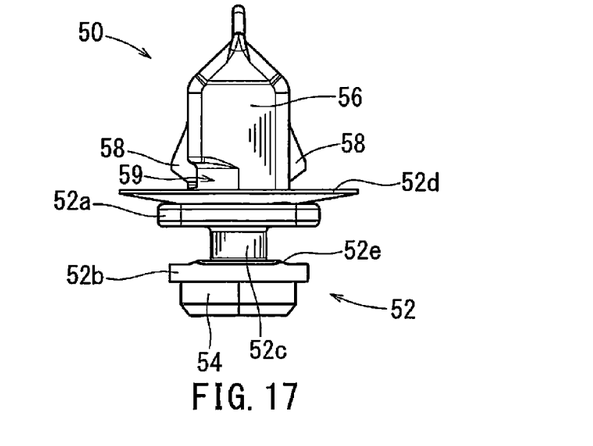
FIG. 17 is a side view of the clip of FIG. 15.

As shown in FIG. 20, the distance between the seal portion 52a and the flange portion 52b is set to be a dimension slightly larger than the thickness of the cover member 10. As shown in FIGS. 16 and 17, a pair of protrusions 52e are provided on the surface of the flange portion 52b facing the seal portion 52a. When the base portion 52 is mounted to the mounting hole 40 of the cover member 10, the seal portion 52a closely contacts the outer surface of the cover member 10 due to the elasticity of the cover member 10.

As shown in FIG. 20, the seal portion 52a is set to a size large enough to close the mounting hole 40 of the cover member 10. The tool block 54 of the flange 52b is set to a dimension which allows passing of the large-diameter hole 40a but which does not allow passing of the small-diameter hole 40b. The neck portion 52c is set to be of an outer diameter which allows it to move from the large-diameter hole 40a of the mounting hole 40 to the small-diameter hole 40b thereof through a slit.

Figure 18:
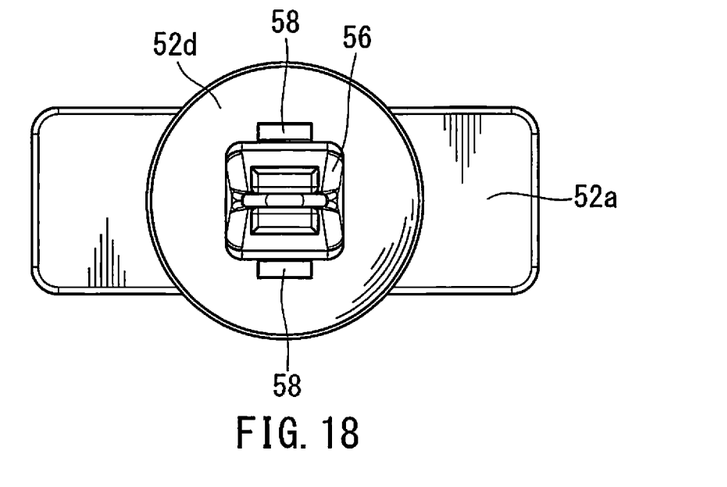
FIG. 18 is a plane view of the clip of FIG. 15.

As shown in FIGS. 15, 18, and 20, like the anchor portion 24 of the above-described clip 20, the anchor portion 56 of the clip 50 has a prism-like configuration which allows insertion into the clip hole 34 of the inner panel 30. The anchor portion 56 is provided with a pair of elastic claws 58. The anchor portion 56 has two arcuate portions 59 on the outer surface thereof. The relationship between the anchor portion 56, the two elastic claws 58, and the clip hole 34 is similar to that of the first embodiment.

As shown in FIG. 20, when mounting the cover member 10 to the inner panel 30, the clip 50 is mounted to the mounting hole 40 of the cover member 10. More specifically, the flange 52b and the tool block 54 of the clip 50 are inserted into the large-diameter hole 40a of the mounting hole 40 from the outer side of the cover member 10 (the side opposite the water receiver 42). After this, the neck portion 52c is moved from the large-diameter hole 40a to the small-diameter hole 40b. As a result, the cover member 10 is held between the seal portion 52a and the flange 52b of the base portion 52. The seal portion 52a closes the entire mounting hole 40, and closely contacts the outer surface of the cover member 10. As in the first embodiment, the clip 50 is maintained in the position in which the two elastic claws 58 are arranged in the direction in which the shorter sides of the clip hole 34 extend.

Next, as shown in FIG. 20, the anchor portion 56 of the clip 50 is inserted into the clip hole 34 of the inner panel 30. The two elastic claws 58 are engaged with the hole edge of the clip hole 34. As in the first embodiment, the cover member 10 is mounted to the inner panel 30 so as to close the service hole 32. The countersunk head 52d of the clip 50 is pressed against the periphery of the clip hole 34 and closely contacts therewith. As a result, the countersunk head 52d seals the clip hole 34.

When detaching the cover member 10 from the inner panel 30, a tool such as a hexagonal wrench is inserted into a tool hole 44 for the cover member 10 shown in FIG. 12. The tool is fit-engaged with the insertion portion 54a of the tool block 54 shown in FIG. 19. As in the first embodiment, the clip 50 is rotated around its axis by 90 degrees. As a result, the two elastic claws 58 of the anchor portion 56 shown in FIG. 15 are arranged in the longitudinal direction of the clip hole 34 of the inner panel 30. Subsequently, the anchor portion 56 is pulled out of the clip hole 34, and the cover member 10 is detached from the inner panel 30.

As shown in FIG. 12, when rotating the clip 50, a tool such as a spanner may be inserted from the upper opening of the water receiver 42, and the tool may be fit-engaged with the hexagonal portion 54b of the tool block 54. Thus, the tool hole 44 of the water receiver 42 may be omitted.

The service hole 32 of the inner panel 30 is closed by the cover member 10. When, in this state, rainwater or the like having entered the door interior falls toward the mounting hole 40 of the cover member 10, most of the rainwater is received by the seal portion 52a of the clip 50 as shown in FIG. 20. Thus, it is possible to prevent rainwater or the like from passing through the mounting hole 40 to go to the inner side of the cover member 10.

As shown in FIG. 20, even if a small amount of water passes the mounting hole 40, that water is received by the water receiver 42, and soon flows to the outer side of the cover member 10 through a drain hole 46. Thus, any water having entered the door interior is prevented from entering the vehicle interior via the mounting hole 40. Further, the seal portion 52a helps to maintain the sound insulation property and dustproofing property at the mounting hole 40.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

The invention claimed is:

1. A waterproofing structure for a vehicle door comprising:
a cover member configured to close a service hole formed in an inner panel; and
a clip configured to detachably mount the cover member to the inner panel; wherein the cover member has:
    a seat portion formed on an outer side of the cover member, the outer side facing the inner panel, wherein the clip is mounted to the seat portion, and
    a tool hole extending through the cover member at a portion corresponding to the seat portion wherein a tool is inserted into the tool hole from an inner side opposite the outer side in order to detach the clip from the inner panel; wherein
the clip has a countersunk head configured to cover the tool hole to seal the tool hole while the clip is mounted to the seat portion of the cover member; wherein
the seat portion of the cover member is situated so as to serve as a canopy with respect to the tool hole, and is configured to change a course of water entering an interior of the door and falling toward the tool hole from the outer side of the cover member.

2. A waterproofing structure for a vehicle door comprising:
a cover member configured to close a service hole formed in an inner panel; and
a clip configured to detachably mount the cover member to the inner panel; wherein
the cover member has:
    a mounting hole configured to extend between an outer side and an inner side of the cover member, the outer side facing the inner panel, the inner side being opposite the outer side,
    a water receiver configured to surround the mounting hole on the inner side of the cover member, and
    a drain hole configured to establish communication between an interior of the water receiver and an exterior of the cover member; wherein
the clip has a seal portion configured to cover the entire mounting hole and to contact the cover member while the clip is mounted to the cover member; wherein
the water receiver of the cover member is configured to receive water entering the inner side of the cover member through the mounting hole; and wherein
the drain hole is configured to discharge the water to the outer side of the cover member.

* * * * *